United States Patent
Yasoshima et al.

(10) Patent No.: US 10,072,564 B2
(45) Date of Patent: Sep. 11, 2018

(54) WASTE-GATE VALVE DEVICE

(71) Applicant: MITSUBISHI HEAVY INDUSTRIES ENGINE & TURBOCHARGER, LTD., Sagamihara-shi, Kanagawa (JP)

(72) Inventors: Takeshi Yasoshima, Tokyo (JP); Motoki Ebisu, Tokyo (JP); Noriyuki Hayashi, Tokyo (JP); Yukihide Nagayo, Tokyo (JP); Takeshi Yoshimi, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 10 days.

(21) Appl. No.: 15/039,968

(22) PCT Filed: Dec. 25, 2013

(86) PCT No.: PCT/JP2013/084672
§ 371 (c)(1),
(2) Date: May 27, 2016

(87) PCT Pub. No.: WO2015/097786
PCT Pub. Date: Jul. 2, 2015

(65) Prior Publication Data
US 2017/0030261 A1 Feb. 2, 2017

(51) Int. Cl.
*F02D 23/00* (2006.01)
*F02B 37/18* (2006.01)

(52) U.S. Cl.
CPC .......... *F02B 37/186* (2013.01); *F02B 37/183* (2013.01); *Y02T 10/144* (2013.01)

(58) Field of Classification Search
CPC ........................................ F02B 37/18–37/186
(Continued)

(56) References Cited

U.S. PATENT DOCUMENTS

2009/0090106 A1 4/2009 Muller
2010/0187460 A1 7/2010 An et al.
(Continued)

FOREIGN PATENT DOCUMENTS

CN 101952568 A 1/2011
DE 10 2011 076 587 A1 11/2012
(Continued)

OTHER PUBLICATIONS

International Preliminary Report on Patentability and Written Opinion of the International Searching Authority (Forms PCT/IB/338, PCT/IB/373, PCT/ISA/237 and PCT/IB/326), dated Jul. 7, 2016, for International Application No. PCT/JP2013/084672, together with an English translation.

(Continued)

*Primary Examiner* — Ngoc T Nguyen
(74) *Attorney, Agent, or Firm* — Birch, Stewart, Kolasch & Birch, LLP

(57) ABSTRACT

To provide a waste-gate valve device with a good flow-rate controllability. A waste-gate valve device 1 includes: a turbine housing 3 provide with a waste-gate channel 2 through which exhaust gas bypasses a turbine; and a waste-gate valve 4 to open and close an outlet of the waste-gate channel 2. The waste-gate valve 4 includes a valve body 7 to open and close the outlet of the waste-gate channel 2, and a protrusion 8 to be housed in the waste-gate channel 2 when the valve body 7 closes the outlet of the waste-gate channel 2. The waste-gate channel 2 ensures a maximum flow rate of exhaust gas at a time when the waste-gate valve is fully open. An area ratio of a flow-path cross-sectional area $A_1$ of the waste-gate channel 2 to a flow-path cross-sectional area $A_2$ of a merging portion is not more than 0.2, the merging portion being a part at which exhaust gas having passed through the turbine merges. A widened portion 2A at which (Continued)

the flow-path cross-sectional area increases is disposed on the outlet of the waste-gate channel.

11 Claims, 12 Drawing Sheets

(58) Field of Classification Search
USPC .......................................................... 60/602
See application file for complete search history.

(56) References Cited

U.S. PATENT DOCUMENTS

| | | |
|---|---|---|
| 2011/0005222 A1 | 1/2011 | Hayashi et al. |
| 2011/0173974 A1 | 7/2011 | Grabowska |
| 2012/0312010 A1 | 12/2012 | Yasoshima |
| 2013/0305711 A1 | 11/2013 | Lueddecke et al. |
| 2015/0014564 A1 | 1/2015 | Nagayo et al. |

FOREIGN PATENT DOCUMENTS

| | | |
|---|---|---|
| DE | 10 2011 108 205 A1 | 1/2013 |
| GB | 2 066 365 A | 7/1981 |
| JP | S56-171631 | 12/1981 |
| JP | 58-2334 U | 1/1983 |
| JP | 60-78941 U | 6/1985 |
| JP | 62-156139 U | 10/1987 |
| JP | 63-177319 U | 11/1988 |
| JP | 2-131032 U | 10/1990 |
| JP | 4-95626 U | 8/1992 |
| JP | 6-43227 U | 6/1994 |
| JP | 2009-92026 A | 4/2009 |
| JP | 2009-203835 A | 9/2009 |
| JP | 2010-90714 A | 4/2010 |
| JP | 2011-179401 A | 9/2011 |
| JP | 2012-504727 A | 2/2012 |
| WO | WO-2013/098884 A1 | 7/2013 |
| WO | WO 2013/128720 A1 | 9/2013 |

OTHER PUBLICATIONS

International Search Report and Written Opinion of the International Searching Authority (Forms PCT/ISA/210, PCT/ISA/220 and PCT/ISA/237), dated Mar. 25, 2014, for International Application No. PCT/JP2013/084672.

Morimune et al., "Study of Compressible High Speed Gas Flow in Piping System—2nd Piping Systems with Sudden Enlargement," Transactions of the JSME, The Japan Society of Mechanical Engineers, B, vol. 46, No. 404, Apr. 25, 1980, pp. 653-660, along with a statement of relevance.

Extended European Search Report effective Nov. 23, 2016, issued in the corresponding EP Application No. 13900040.0.

European Office Action issued in corresponding EP Application No. 13900040.0 dated Oct. 16, 2017.

Chinese Office action issued in corresponding Chinese Application No. 201380080866.1 dated Oct. 31, 2017.

WASTE-GATE VALVE DEVICE

TECHNICAL FIELD

The present invention relates to a waste-gate valve device which diverts a part of exhaust gas, in an engine supercharged by a turbocharger, to adjust a flow rate of exhaust gas entering a turbine.

BACKGROUND ART

Patent Document 1 discloses a waste-gate valve device with a waste-gate channel bypassing a turbine formed into a tapered shape widened from an inlet toward an outlet, with a valve body (waste-gate valve) for closing the outlet of the waste-gate channel including a protrusion of such a height that the protrusion is flush with an inlet-side wall surface of the waste-gate channel when the waste-gate channel is closed. With the above waste-gate valve device, when the valve body closes the waste-gate channel, the upper surface of the protrusion is flush with the inlet-side wall surface of the waste-gate channel, which makes it possible to reduce turbulence in an exhaust-gas flow at an inlet side of the turbine. Further, with the waste-gate channel having a tapered shape widened from the inlet toward the outlet, a larger gap may be formed between a side surface of the protrusion and an inner peripheral surface of the waste-gate channel even when the valve body is slightly open. Thus, it is possible to achieve a larger opening area for the waste-gate channel.

Patent Document 2 discloses a waste-gate valve device including a tapered portion at an outlet side of a waste-gate channel bypassing a turbine, so that a flow-path cross-sectional area gradually increases. With the above waste-gate valve device, a pressure-reduction region is formed between the tapered portion and a valve body (waste-gate valve), and the speed of an exhaust-gas flow bypassing the turbine increases in the pressure-reduction region, which makes it possible to reduce a force, especially a moment, applied to the valve body.

Patent Document 3 discloses a waste-gate valve device with a valve body (waste-gate valve) for closing an outlet of a waste-gate channel, the valve body including a protrusion on a surface adjacent to the waste-gate channel (a seating surface) formed to have a cross section of a "+" shape. With the above waste-gate valve device, it is possible to considerably reduce a negative pressure generated in clearance between the valve body and a valve seat due to turbulence of an exhaust flow flowing through a slight gap (clearance) between the valve body and the valve seat (outlet) at the outlet of the waste-gate channel.

CITATION LIST

Patent Literature

Patent Document 1: JPH4-95626U (Utility Model)
Patent Document 2: JP2009-203835A
Patent Document 3: JPS60-78941U (Utility Model)

SUMMARY

Problems to be Solved

However, with the above waste-gate valve devices described in Patent Documents 1 to 3, a flow rate cannot be sufficiently reduced when the valve body is slightly open (hereinafter, referred to as "at the time of slight open"). Furthermore, a great load is applied when the valve body opens, which deteriorates flow-rate controllability.

The present invention was made in view of the above, and an object of the present invention is to provide a waste-gate valve device with high flow-rate controllability at the time of slight open.

Solution to the Problems

A waste-gate valve device according to the present invention comprises: a turbine housing comprising a waste-gate channel through which exhaust gas bypasses a turbine; and a waste-gate valve configured to open and close an outlet of the waste-gate channel, the waste-gate valve comprising a valve body configured to open and close the outlet of the waste-gate channel, and a protrusion configured to be housed in the waste-gate channel when the valve body closes the outlet of the waste-gate channel. The waste-gate channel ensures a maximum flow rate of exhaust gas at a time when the waste-gate valve is fully open. A flow-path cross-sectional area ratio of the waste-gate channel to a merging portion is not more than 0.2, the merging portion being a portion at which exhaust gas having passed through the turbine merges. A widened portion at which the flow-path cross-sectional area increases is disposed on the outlet of the waste-gate channel.

According to the present invention, a flow rate of exhaust gas flowing through the waste-gate channel increases, and thus it is possible to reduce a flow-path cross-sectional area of the waste-gate channel in accordance with an amount of the increase. As a result, flow-rate controllability of a flow rate of exhaust gas at the time of slight open of the waste-gate valve improves.

In an aspect of the present invention, a flow-path diameter $D_1$ of the waste-gate channel may satisfy a following expression 1, with respect to a relationship to a flow-path diameter $D_2$ of the merging portion.

$$D_1 \leq 0.469 \times D_2 - 0.5 \qquad \text{(Expression 1)}$$

In this way, it is possible to ensure machining accuracy and to achieve a suitable ratio of a flow-path cross-sectional area of the waste-gate channel to that of the merging portion.

Further, in an aspect of the present invention, an outlet diameter $D_3$ of the widened portion may satisfy a following expression 2, with respect to a relationship to the flow-path diameter $D_1$ of the waste-gate channel.

$$D_3 \geq 1.049 D_1 \qquad \text{(Expression 2)}$$

In this way, it is possible to achieve a suitable ratio of a flow-path cross-sectional area of the outlet of the widened portion to that of the waste-gate channel.

Further, in an aspect of the present invention, the protrusion may include a pressure-receiving portion configured to, when the waste-gate valve is opened, receive a pressure of exhaust gas flowing through the waste-gate channel, in a region close to a shaft supporting the waste-gate valve, and a reducing portion configured to reduce the flow of exhaust gas flowing through the waste-gate channel, in a region remote from the shaft.

In this way, the pressure-receiving portion can receive a pressure of exhaust gas in a region close to the shaft supporting the waste valve when the waste-gate valve opens, and the reducing portion can reduce a flow of exhaust gas in a region remote from the shaft.

Further, in an aspect of the present invention, the pressure-receiving portion may be formed in the region close to the shaft, and the reducing portion may be formed in the region remote from the shaft.

In this way, the pressure-receiving portion can receive a pressure of exhaust gas in a region close to the shaft, and the reducing portion can reduce a flow of exhaust gas in a region remote from the shaft.

Further, in an aspect of the present invention, the pressure-receiving portion may be formed in an arc shape which forms a recess portion between the pressure-receiving portion and the reducing portion.

In this way, the recess portion can receive a pressure of exhaust gas effectively.

Further, in an aspect of the present invention, the protrusion may include a recess section which receives exhaust gas flowing through the waste-gate channel.

In this way, the recess portion can receive a pressure of exhaust gas effectively.

In an aspect of the present invention, a base portion of the protrusion may include an expanded portion which expands along an inner periphery of the widened portion.

In this way, it is possible to avoid stress concentration between the protrusion and the valve body.

In an aspect of the present invention, the valve body may have a rim portion disposed on a seating side of the valve body and formed into a shape of a curved surface.

In this way, exhaust gas having flowed through the waste-gate channel flows by the rim portion of the valve body smoothly, which makes it possible to reduce a load applied to the waste-gate valve.

In an aspect of the present invention, the valve body may comprise an end portion for opening and closing the waste-gate channel, a base portion, and an elastic-deformation portion disposed between the end portion and the base portion and configured to warp the end portion.

In this way, the end portion of the valve body warps if the waste-gate valve closes an outlet of the waste-gate channel, which makes it possible to ensure sealability of the waste-gate valve.

In an aspect of the present invention, the waste-gate valve device may further comprise: a drive shaft to which the waste-gate valve is fixed; and a bush supporting the drive shaft, and a tapered surface may be formed on an inner peripheral surface of the bush.

In this way, it is possible to prevent uneven contact of the drive shaft with the bush, and to prevent generation of an edge surface pressure.

In an aspect of the present invention, the waste-gate valve device may further comprise: a drive shaft comprising an end to which the waste-gate valve is fixed; a bush supporting the drive shaft; a lever pin disposed on another end of the drive shaft; and an actuator comprising a rod coupled to the lever pin. The lever pin and the actuator are disposed so that a pressure direction applied to the waste-gate valve coincides with an operational direction of the actuator.

Accordingly, a pressure direction of exhaust gas applied to the waste-gate valve coincides with an operational direction of the actuator. In this way, it is possible to prevent inclination of the drive shaft in the bush. As a result, it is possible to reduce leakage of exhaust gas outside the turbine housing through clearance disposed between the drive shaft and the bush.

Advantageous Effects

As described above, according to the present invention, pressure loss of exhaust gas flowing through the waste-gate channel is reduced, and a flow rate of exhaust gas increases in accordance with an amount of the reduction. Thus, it is possible to reduce a flow-path cross-sectional area of the waste-gate channel in accordance with an amount of the increase in the flow rate of exhaust gas. As a result, it is possible to achieve good flow-rate controllability at the time of slight open of the waste-gate valve.

DETAILED DESCRIPTION

With reference to the accompanying drawings, embodiments of a waste-gate valve device according to the present invention will now be specifically described. The present invention should not limited by the following embodiments.

Figure 1:
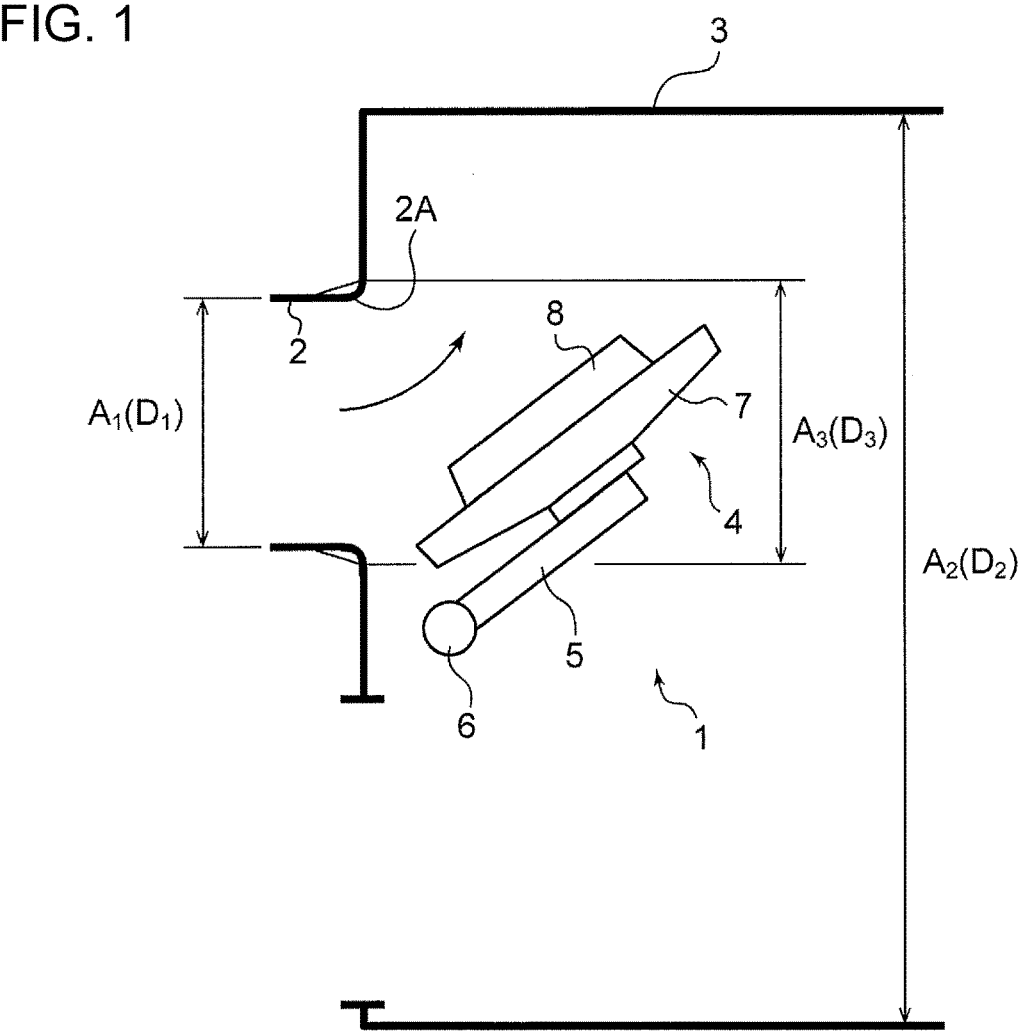
FIG. 1 is a conceptual diagram for describing a waste-gate valve device according to an embodiment of the present invention.
Figure 2:
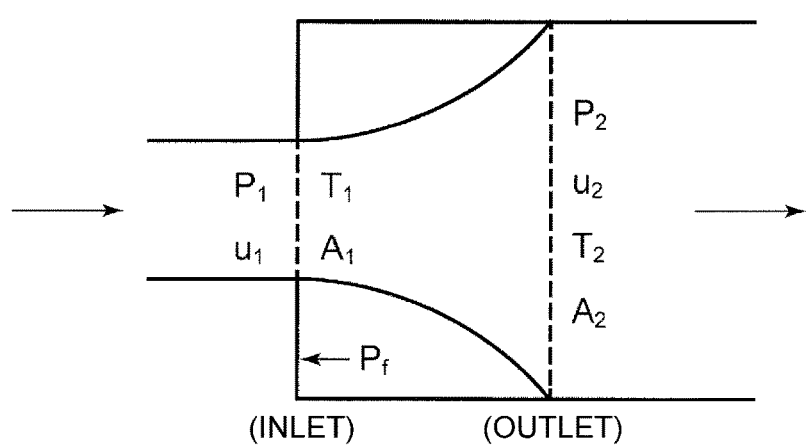
FIG. 2 is a diagram of an analysis model of flow-path expansion.
Figure 3:
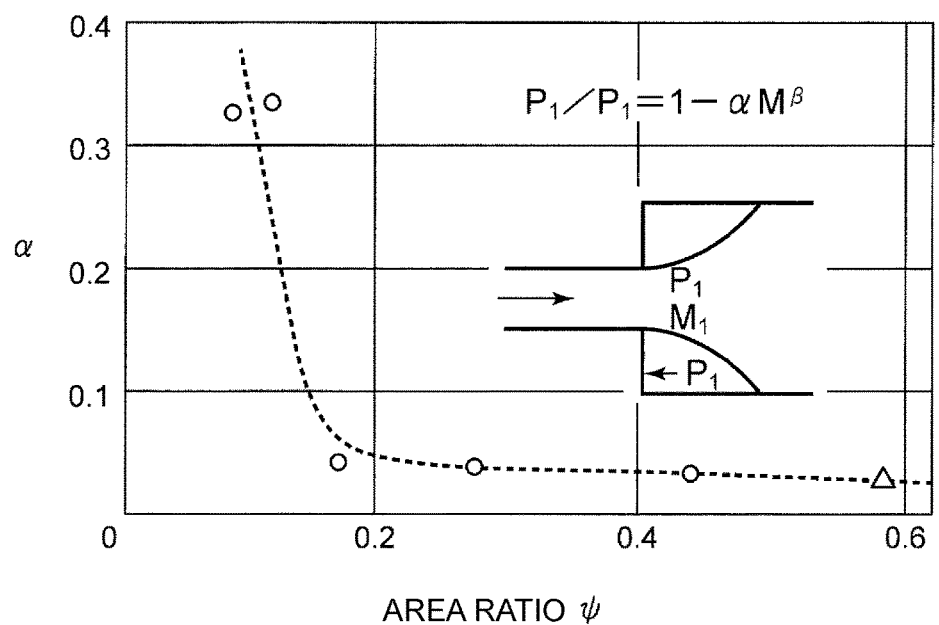
FIG. 3 is a chart showing a relationship between an area ratio and coefficient $\alpha$ of an experimental expression.
Figure 4:
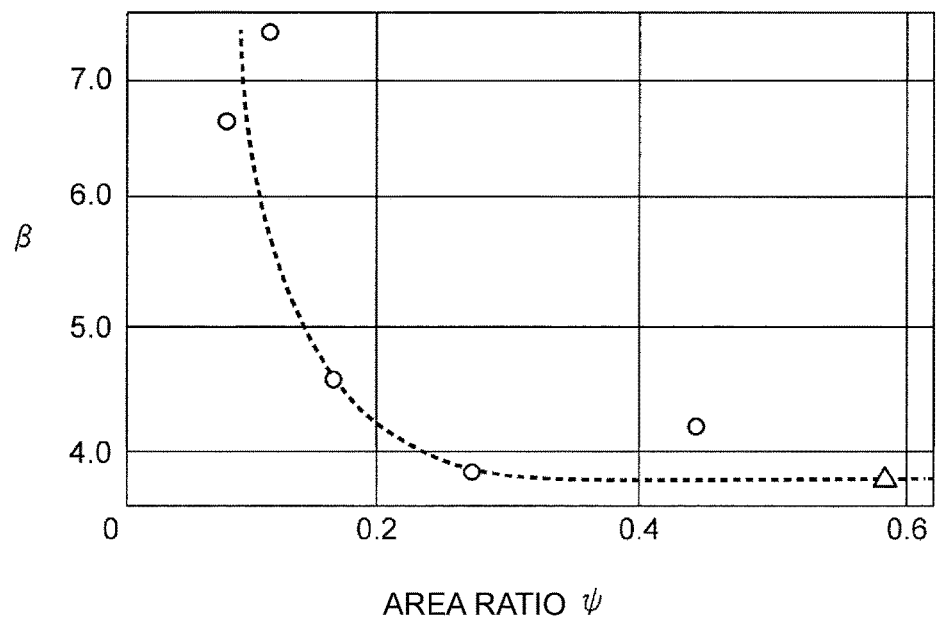
FIG. 4 is a chart showing a relationship between an area ratio and coefficient $\beta$ of an experimental expression.

FIG. 1 is a conceptual diagram for describing a waste-gate valve according to an embodiment of the present invention. FIG. 2 is a diagram of a model of flow-path expansion. FIG. 3 is a chart showing a relationship between an area ratio and coefficient α of an experimental expression, and FIG. 4 is a chart showing a relationship between an area ratio and coefficient β of an experimental expression.

A waste-gate valve device 1 diverts a part of exhaust gas, in an engine supercharged by a turbocharger, to adjust a flow rate of exhaust gas entering a turbine. As illustrated in FIG. 1, the waste-gate valve device 1 includes a turbine housing 3 with a waste-gate channel 2 through which exhaust gas bypasses a turbine (not illustrated), and a waste-gate valve 4 for opening and closing the waste-gate channel 2. The waste-gate valve 4 is fixed to a drive shaft 6 via a lever 5 and pivots about an axis passing through the center of the drive shaft 6, whereby the waste-gate channel 2 is opened and closed. Accordingly, while the waste-gate valve 4 is open, the flow path is narrowed at the side close to the drive shaft 6, and widened at the side remote from the drive shaft 6. Further, the waste-gate valve 4 according to the present embodiment includes a valve body 7 which opens and closes an outlet of the waste-gate channel 2, and a protrusion 8 which is to be housed in the waste-gate channel 2 when the valve body 7 closes the outlet of the waste-gate channel 2.

Exhaust gas having flowed through the waste-gate channel 2 merges with exhaust gas having flowed through the turbine, at a downstream side of the waste-gate channel 2. Thus, a flow-path cross-sectional area of exhaust gas flowing through the waste-gate channel 2 expands rapidly. It is known that rapid expansion in a flow-path cross-sectional area of exhaust gas may cause pressure loss, and related findings are disclosed in "Research Report of the R&D Sectional Committee on High-speed Flow of Gas in a Tube" (The Japan Society of Mechanical Engineers, 1978).

According to the document, an expansion surface pressure $P_f$ is proposed as a parameter to represent pressure loss upon flow-path rapid expansion, as illustrated in FIG. 2. The more rapidly a flow path expands, the smaller the expansion surface pressure $P_f$ is. With a decrease in the value (of expansion surface pressure $P_f$), greater turbulence occurs in an exhaust-gas flow, and the pressure loss increases. The expansion surface pressure $P_f$ is expressed by the following experimental expression (expression 3).

$$P_f/P_1 = 1 - \alpha M_1^\beta \quad (3) \text{ (Expression 3)}$$

$M_1$: Mach number

Meanwhile, as shown in the expression 1, the expansion surface pressure $P_f$ is affected by coefficients α, β. As shown in FIGS. 3 and 4, coefficient α and coefficient β of the experimental expression change in accordance with an area ratio ψ, and rapidly changes at an area ratio $\psi(A_1/A_2)=0.22$ and below. Accordingly, the expansion surface pressure $P_f$ changes considerably at an area ratio ψ=0.22 and below.

Even if a widened portion 2A is provided at the outlet of the waste-gate channel 2 having an area ratio $\psi(A_1/A_2)$ of 0.22 to expand the flow path, the area ratio $\psi(A_3/A_2)$ would be 0.22 or higher. Thus, as illustrated in FIG. 1, an effect to expand the flow path (to reduce pressure loss) is reduced.

Further, if the minimum expansion is set to be 0.5 mm in diameter and a difference in area ratio of at least 0.02 $(A_1/A_2 - A_3/A_2)$ is ensured, taking account of machining accuracy, a threshold value of $A_1$ with respect to $A_2$ can be defined by the following expression 4.

$$A_1 = 0.2 \times A_2 \quad (4) \text{ (Expression 4)}$$

Herein, the number in the expression 4 is 0.2 and not 0.22 because the position of an inflexion point is 0.22 as illustrated in FIGS. 3 and 4, and a difference in area ratio at a rapid-change region, which is approximately one-tenth (0.22×0.1=0.02), is subtracted.

With the expression 4 converted into a flow-path diameter, the diameter $D_1$ can be obtained from the following expression 5.

$$D_1 = 0.447 \times D_2 \quad (5) \text{ (Expression 5)}$$

Here, given that $A_1=(D_1/2)^2 \times \pi$, $A_2=(D_2/2)^2 \times \pi$, and $A_3=(D_3/2)^2 \times \pi$, the following expressions are satisfied:

$$A_1/A_2 \leq 0.2 \rightarrow D_1 \leq 0.447 D_2$$

$$A_3/A_2 \leq 0.22 \rightarrow D_3 \leq 0.469 D_2$$

$$D_3 - D_1 \geq (0.469 - 0.447) D_2$$

$$D_3 - D_1 \geq 0.022 \times D_2$$

$$D_3 - D_1 \geq 0.022 \times D_1/0.447$$

$$D_3 - D_1 \geq 0.049 D_1$$

Accordingly, a relationship (expansion width) of the outlet diameter $D_3$ of the widened portion 2A to $D_1$ can be expressed by the following expression 6.

$$D_5 - D_1 \geq 0.049 D_1 \quad (6) \text{ (Expression 6)}$$

Further as illustrated in FIGS. 3 and 4, since the area ratio $\psi(A_1/A_2)$ at the inflexion point is 0.22, if converted into a flow-path diameter, an expression of $D_1/D_2=0.469$ would be satisfied, which can be also expressed as an expression of $D_1=0.469 D_2$. Further, since the minimum expansion width is set to 0.5 mm taking account of machining accuracy as described above, the diameter $D_1$ of the waste-gate channel 2 is further reduced by 0.5 mm. Accordingly, the diameter $D_1$ of the waste-gate channel 2 is required to satisfy the following expression 7.

$$D_1 \leq 0.469 \times D_2 - 0.5 \quad (7) \text{ (Expression 7)}$$

Summarizing the above, for the waste-gate valve device 1 satisfying an expression of $D_1 < D_2$, where $D_1$ is the diameter of the waste-gate channel 2 and $D_2$ is the diameter of the merging portion, rapid expansion of a flow path is suppressed and pressure loss is reduced if $D_1$, the diameter of the waste-gate channel 2, satisfies an expression of $D_1 \leq 0.47 D_2 - 0.5$, and $D_3$, the outlet diameter of the widened portion 2A, satisfies an expression of $D_3 \geq 1.049 D_1$. Accordingly, it is possible to reduce the diameter $D_1$ of the waste-gate channel 2 in accordance with a flow rate increased by reduction of pressure loss. In this way, flow-rate controllability of the waste-gate valve device 1 is improved in accordance with a reduced amount of the diameter $D_1$ of the waste-gate channel 2.

First Embodiment

Figure 5:
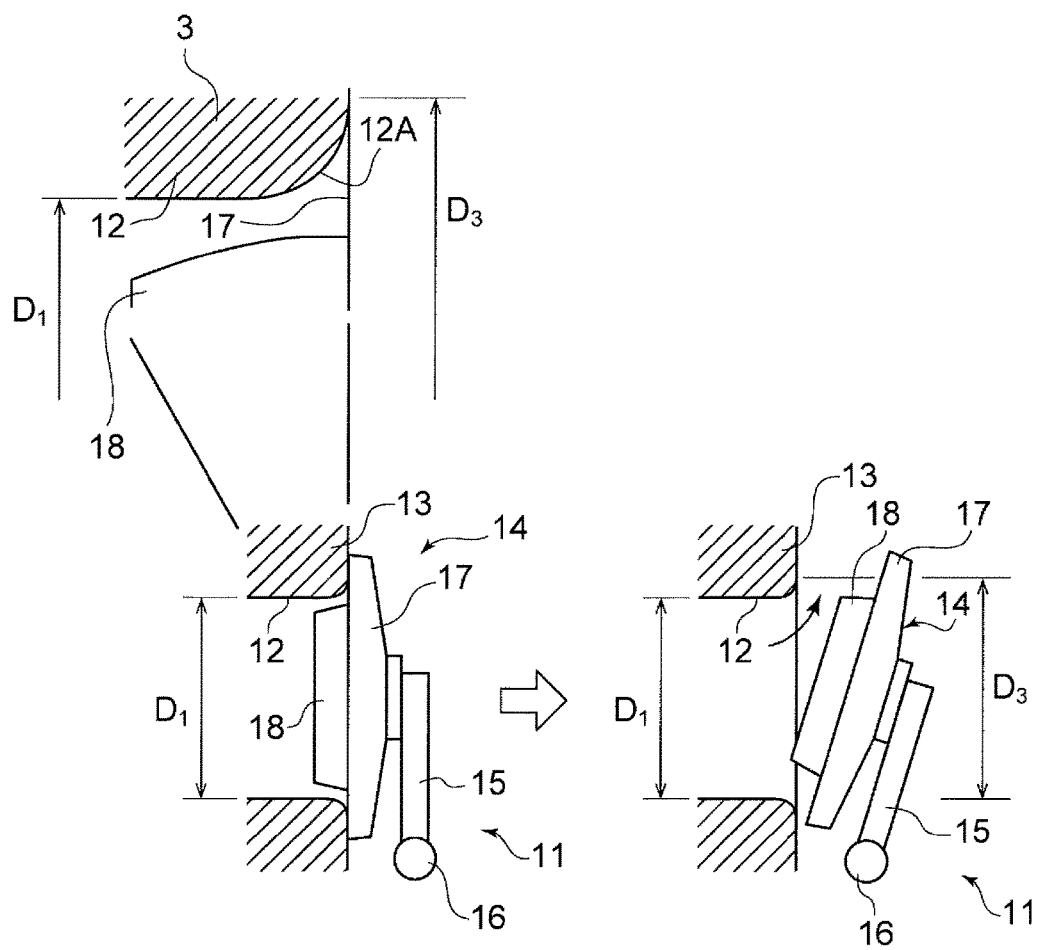
FIG. 5 is a schematic diagram of a waste-gate valve device according to the first embodiment of the present invention.
Figure 6:
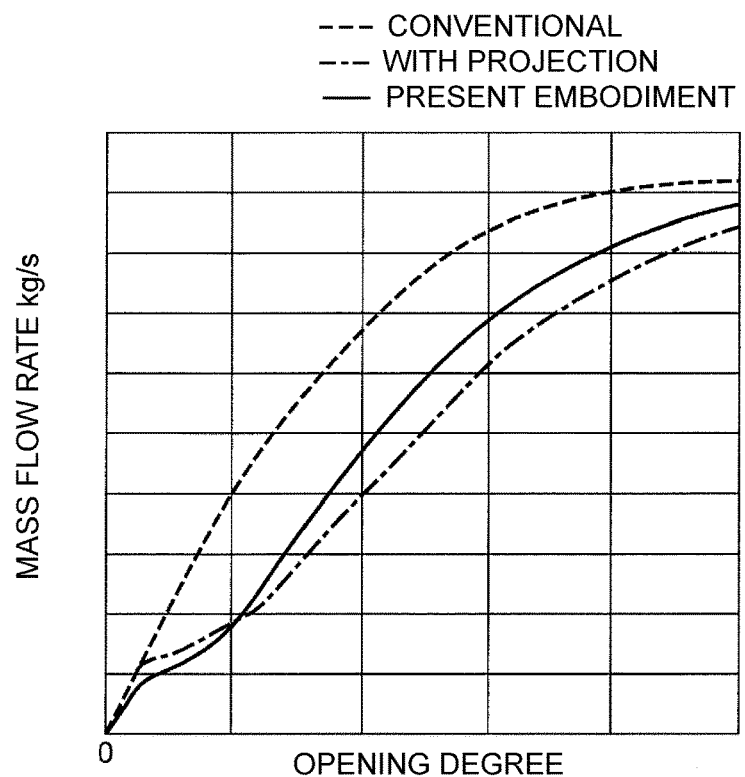
FIG. 6 is a diagram of a relationship between an opening degree of a waste-gate valve of the waste-gate valve device illustrated in FIG. 5 and a mass flow rate of exhaust gas flowing through a waste-gate channel.
Figure 7:
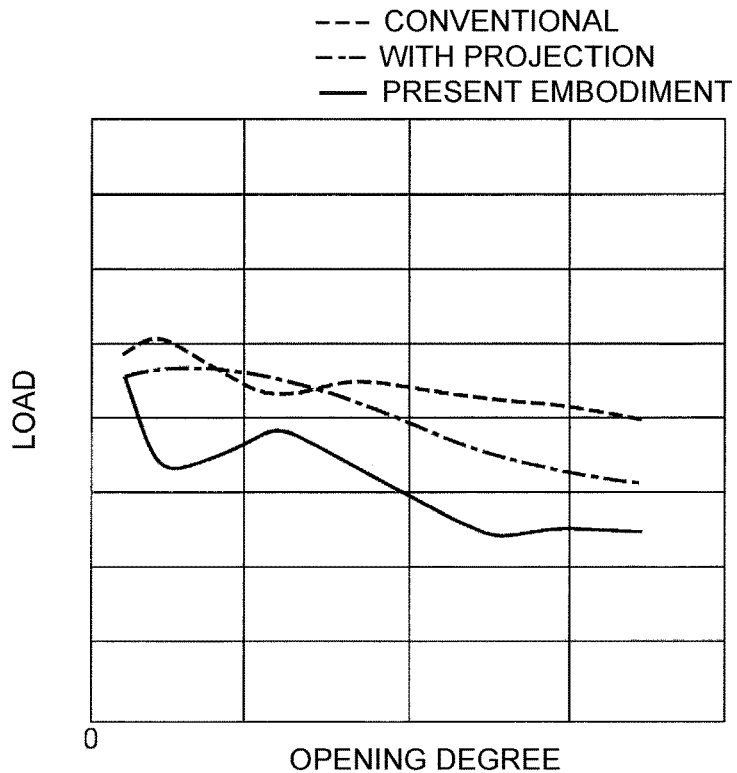
FIG. 7 is a diagram of a relationship between an opening degree of a waste-gate valve of the waste-gate valve device illustrated in FIG. 5 and a load applied to a shaft supporting the waste-gate valve.

FIG. 5 is a schematic diagram of a waste-gate valve device according to the first embodiment of the present invention. FIG. 6 is a diagram of a relationship between an opening degree of a waste-gate valve and a mass flow rate of exhaust gas flowing through a waste-gate channel, in the waste-gate valve device illustrated in FIG. 5. FIG. 7 is a diagram of a relationship between an opening degree of a waste-gate valve and a load applied to a shaft supporting the waste-gate valve, in the waste-gate valve device illustrated in FIG. 5.

As illustrated in FIG. 5, the waste-gate valve device 11 according to the first embodiment of the present invention includes a turbine housing 13 with a waste-gate channel 12 through which exhaust gas bypasses a turbine (not illustrated), and a waste-gate valve 14 for opening and closing the waste-gate channel 12. The waste-gate valve 14 is fixed to a drive shaft 16 via a lever 15 and pivots about an axis passing through the center of the drive shaft 16, whereby the waste-gate channel 12 is opened and closed. Accordingly, when the waste-gate valve 14 is open, the flow path is narrower at the side close to the drive shaft 16, and wider at the side remote from the drive shaft 16.

The diameter $D_1$ of the waste-gate channel 12 satisfies the above expression 7 while ensuring the maximum flow rate of exhaust gas at the time when the waste-gate valve 14 is fully open. For instance, if the diameter $D_2$ is 100 mm at the merging portion where exhaust gas having flowed through the waste-gate channel 12 and exhaust gas having flowed through the turbine merge (see FIG. 1), the diameter $D_1$ of the waste-gate channel 12 is set to not more than 44.6 mm, for instance, to 40 mm. Accordingly, the diameter $D_1$ of the waste-gate channel 12 according to the first embodiment is smaller than that of a conventional case, but the drive shaft 16 for driving the waste-gate valve 14 is disposed on the same position as that in a conventional case. As a result, the waste-gate channel 12 is positioned closer to the drive shaft 16.

A widened portion 12A is disposed on the outlet of the waste-gate channel 12. The widened portion 12A is to increase a flow-path cross-sectional area of the waste-gate channel 12, and the outlet diameter $D_3$ of the widened portion 12A satisfies the above expression 6. For instance, if the diameter $D_1$ of the waste-gate channel 12 is 40 mm, the outlet diameter $D_3$ of the widened portion 12A is set to at least 41.96 mm, for instance, to 42 mm. Accordingly, the widened portion 12A is gradually widened as illustrated in FIG. 5. In the example illustrated in FIG. 5, the widened portion 12A is gradually widened so as to form a curve (R) in cross section. However, configuration of the widened portion 12A is not limited to this, and may be gradually widened so as to form an oblique line in cross section.

Further, the waste-gate valve 14 according to the first embodiment of the present invention includes a valve body 17 which opens and closes an outlet of the waste-gate channel 12, and a protrusion 18 which is to be housed in the waste-gate channel 12 when the valve body 17 closes the waste-gate channel 12. The valve body 17 is formed into a disc shape having a size sufficient to close an outlet of the waste-gate channel 12, which is an outlet of the widened portion 12A. The protrusion 18 is formed into a truncated conical shape, and as described above, housed in the waste-gate channel 12 when the valve body 17 closes the outlet of the waste-gate channel 12. Also, when the valve body 17 opens the waste-gate channel 12, the protrusion 18 remains in a flow of exhaust gas having flowed the waste-gate channel 12, which improves flow-rate controllability of exhaust gas at the time of slight open. Thus, the size of the protrusion 18 is set in accordance with the diameter $D_1$ of the waste-gate channel 12. The larger the protrusion 18 is within a range that the protrusion 18 can be housed in the waste-gate channel 12, the more the flow-rate controllability at the time of slight open of the waste-gate valve 14 improves.

Further, whereas the waste-gate valve 14 is connected to the drive shaft 16 for driving the waste-gate valve 14 via a lever 15, similarly to a conventional case, the lever 15 is formed to be shorter than that in a conventional case in accordance with a decrease in the distance between the waste-gate channel 12 and the drive shaft 16.

In the waste-gate valve device 11 according to the present embodiment of the present invention, the diameter $D_1$ of the waste-gate channel 12 satisfies the above described expression 7, and the outlet diameter $D_3$ of the waste-gate channel 12 satisfies the above described expression 6, which makes it possible to reduce pressure loss. Accordingly, it is possible to reduce the diameter $D_1$ of the waste-gate channel 12 in accordance with a flow rate increased by reduction of pressure loss. In this way, as illustrated in FIG. 6, flow-rate controllability of the waste-gate valve device 11 at the time of slight open is improved in accordance with a reduced amount of the diameter $D_1$ of the waste-gate channel 12. Further, the protrusion 18 is housed in the waste-gate channel 12 when the valve body 17 closes the outlet of the waste-gate channel 12, and remains in a flow of exhaust gas when the valve body 17 opens the waste-gate channel 12, which synergistically improves flow-rate controllability at the time of slight open. Further, since the lever 15 is shorter than that in a conventional case, a load applied to the lever 15 is smaller than that in a conventional case, as illustrated in FIG. 7, which also contributes to improvement of flow-rate controllability.

Second Embodiment

Figure 8:
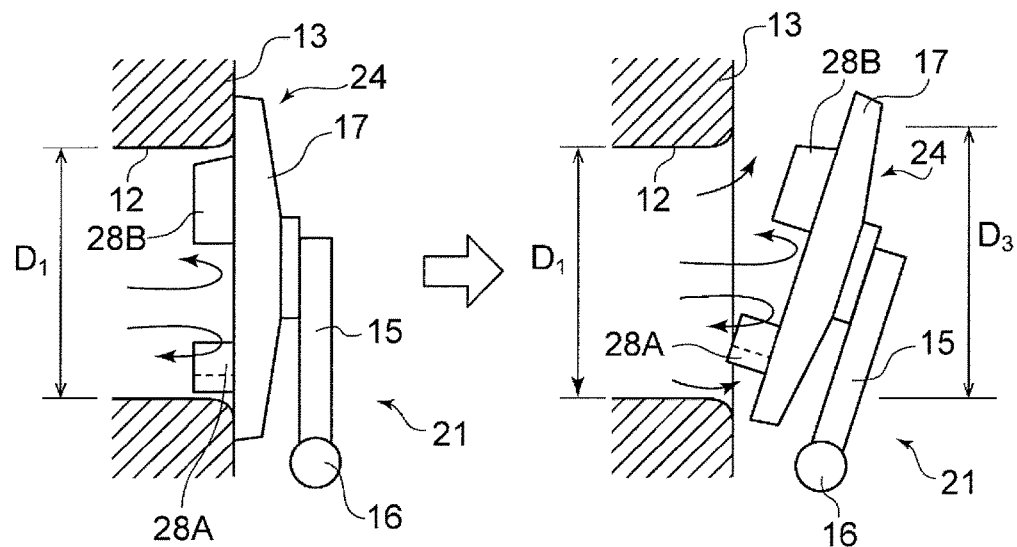
FIG. 8 is a schematic diagram of a waste-gate valve device according to the second embodiment of the present invention.
Figure 9:
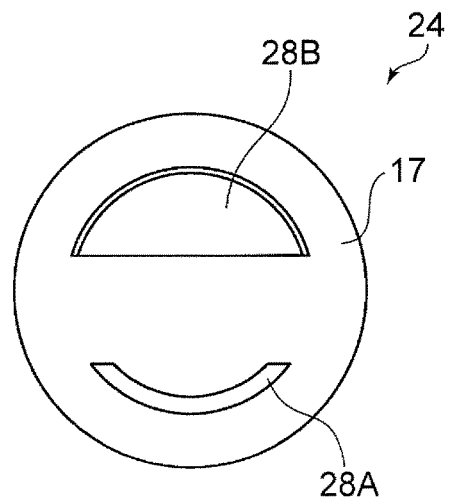
FIG. 9 is a schematic diagram of the waste-gate valve illustrated in FIG. 8.

FIG. 8 is a schematic diagram of a waste-gate valve device according to the second embodiment of the present invention. FIG. 9 is a schematic diagram of the waste-gate valve illustrated in FIG. 8. A waste-gate valve device according to the second embodiment of the present invention is not different from the waste-gate valve device 11 according to the above described first embodiment of the present invention, except for protrusions 28A, 28B of a waste-gate valve 24. Thus, the same feature as that in the waste-gate valve device 11 according to the first embodiment of the present invention is indicated by the same reference numeral and not described in detail.

As illustrated in FIGS. 8 and 9, the waste-gate valve device 21 according to the second embodiment of the present invention includes a pressure-receiving portion (the first protrusion 28A) and a reducing portion (the second protrusion 28B) disposed on the waste-gate valve 24.

The pressure-receiving portion is to receive more pressure at a drive-shaft side of the waste-gate valve 24 when the waste-gate valve 24 opens. As illustrated in FIG. 8, the pressure-receiving portion according to the second embodiment includes the first protrusion 28A disposed in a region closer to the drive shaft 16 of a surface facing the waste-gate channel 12, in the waste-gate valve 24. The first protrusion 28A is disposed so as to form a recess portion between the first protrusion 28A and the reducing portion (the second protrusion 28B), and has an arc shape as seen from the side of the waste-gate channel, as illustrated in FIG. 9. The pressure-receiving portion (the first protrusion 28A) resists exhaust gas having flowed through the waste-gate channel 12, whereby a pressure is applied to the drive-shaft side of the waste-gate valve 24.

The reducing portion is to reduce a flow-rate change amount at the time of slight open of the waste-gate valve 24. As illustrated in FIG. 8, the reducing portion according to the second embodiment includes the second protrusion 18B disposed on a side remote from the drive shaft 16 of a surface facing the waste-gate channel 12, in the waste-gate valve 24. The second protrusion 28B has a substantially-halved truncated conical shape, as seen from the side of the waste-gate channel, as illustrated in FIG. 9. The second protrusion 28B has a height not greater than half the diameter $D_1$ of the waste-gate channel. This is because, if the height of the second protrusion 28B is greater than half the diameter $D_1$ of the waste-gate channel, an excessive load could be applied to the lever 15 when the waste-gate valve 24 opens. As illustrated in FIG. 8, the second protrusion 28B remains in a flow of exhaust gas having flowed the waste-gate channel 12 when the waste-gate valve 24 opens the waste-gate channel 12, which improves flow-rate controllability at the time of slight open of the waste-gate valve 24.

The waste-gate valve device 21 according to the second embodiment of the present invention is capable of applying more pressure to the drive-shaft side of the waste-gate valve 24 when the waste-gate valve 24 opens, and of reducing a flow-rate change amount at the time of slight open of the waste-gate valve 24. Accordingly, it is possible to improve flow-rate controllability of exhaust gas.

Third Embodiment

Figure 10:
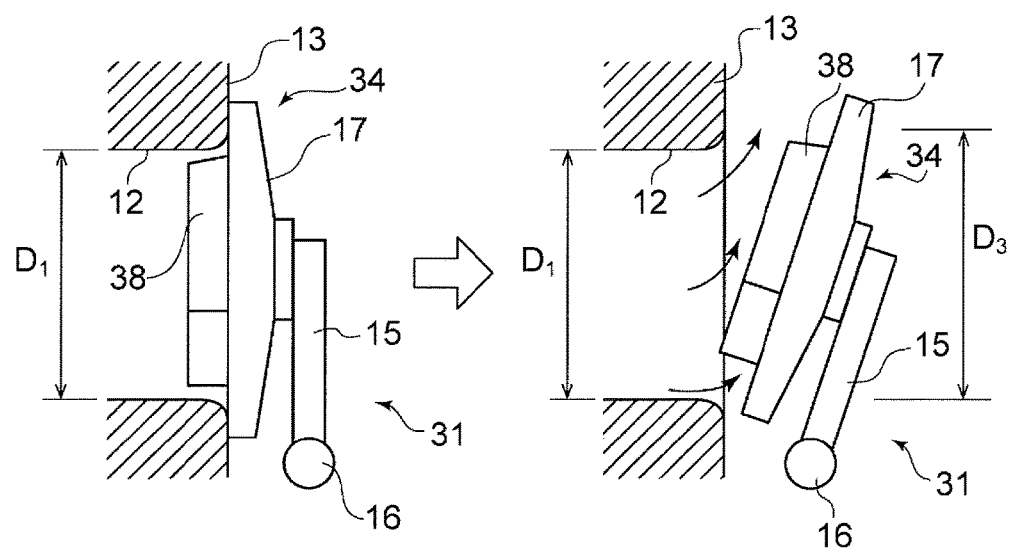
FIG. 10 is a schematic diagram of a waste-gate valve device according to the third embodiment of the present invention.
Figure 11:
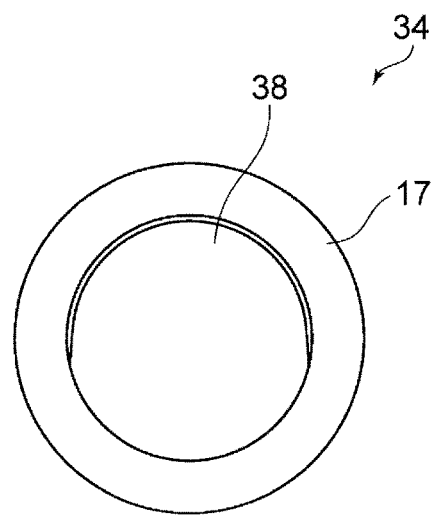
FIG. 11 is a schematic diagram of the waste-gate valve illustrated in FIG. 10.

FIG. 10 is a schematic diagram of a waste-gate valve device according to the third embodiment of the present invention. FIG. 11 is a schematic diagram of the waste-gate valve illustrated in FIG. 10. A waste-gate valve device 31 according to the third embodiment of the present invention is not different from the waste-gate valve device 11 according to the above described first embodiment of the present invention, except for a protrusion 38 of a waste-gate valve 34. Thus, the same feature as that in the waste-gate valve device 11 according to the first embodiment of the present invention is indicated by the same reference numeral and not described in detail.

As illustrated in FIGS. 10 and 11, the waste-gate valve device 31 according to the present embodiment of the present invention includes the protrusion 38 integrally including a pressure-receiving portion and a reducing portion disposed on the waste-gate valve 34.

The pressure-receiving portion is to receive more pressure at the drive shaft of the waste-gate valve 34 when the waste-gate valve 34 opens. A side of the protrusion 38, according to the third embodiment of the present invention, closer to the drive shaft 16 forms a pressure-receiving portion. The pressure-receiving portion has a halved-cylindrical shape, as seen from the side of the waste-gate channel, as illustrated in FIG. 11.

The reducing portion is to reduce a flow-rate change amount at the time of slight open of the waste-gate valve 34. A side of the protrusion 38, according to the fourth embodiment, remote from the drive shaft 16 forms a reducing portion. The reducing portion has a halved truncated conical shape, as seen from the side of the waste-gate channel, as illustrated in FIG. 11.

The protrusion 38 has a height not greater than half the diameter $D_1$ of the waste-gate channel. This is because, if the height of the protrusion 38 is greater than half the diameter $D_1$ of the waste-gate channel, an excessive load could be applied to the lever 15 when the waste-gate vale 34 opens. As illustrated in FIG. 10, the protrusion 38 remains in a flow of exhaust gas having flowed through the waste-gate channel 12 when the waste-gate valve 34 opens the outlet of the waste-gate channel 12, which improves flow-rate controllability at the time of slight open.

The waste-gate valve device 31 according to the third embodiment of the present invention is capable of applying more pressure to the drive-shaft side of the waste-gate valve 34 when the waste-gate valve 34 opens, and of improving flow-rate controllability at the time of slight open of the waste-gate valve 34.

Fourth Embodiment

Figure 12:
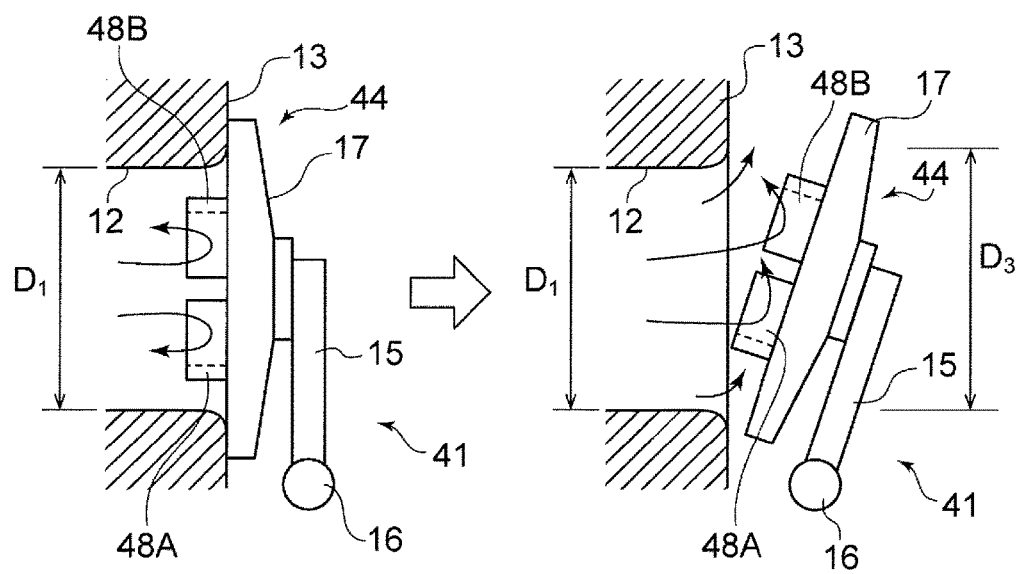
FIG. 12 is a schematic diagram of a waste-gate valve device according to the fourth embodiment of the present invention.
Figure 13:
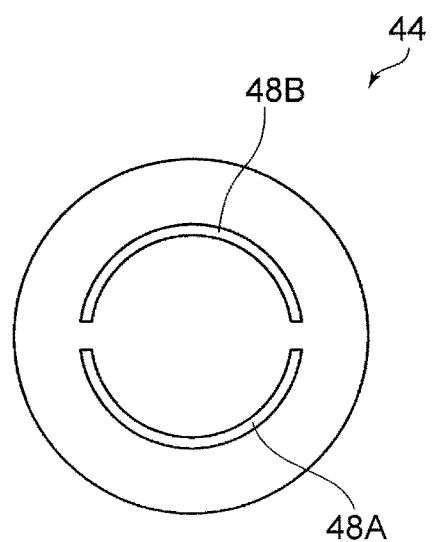
FIG. 13 is a schematic diagram of the waste-gate valve illustrated in FIG. 12.

FIG. 12 is a schematic diagram of a waste-gate valve device according to the fourth embodiment of the present invention. FIG. 13 is a schematic diagram of the waste-gate valve illustrated in FIG. 12. A waste-gate valve device 41 according to the fourth embodiment of the present invention is not different from the waste-gate valve device 11 according to the above described first embodiment of the present invention, except for protrusions 48A, 48B of a waste-gate valve 44. Thus, the same feature as that in the waste-gate valve device 11 according to the first embodiment of the present invention is indicated by the same reference numerals and not described in detail.

As illustrated in FIGS. 12 and 13, the waste-gate valve device 41 according to the fourth embodiment of the present invention includes a pressure-receiving portion (the first protrusion 48A) and a reducing portion (the second protrusion 48B) disposed on the waste-gate valve 44.

The pressure-receiving portion is to receive more pressure at a drive-shaft side of the waste-gate valve 44 when the waste-gate valve 44 opens. As illustrated in FIG. 12, the pressure-receiving portion according to the third embodiment of the present invention includes the first protrusion 48A disposed in a region closer to a surface facing the waste-gate channel 12, in the waste-gate valve 44. The first protrusion 48A is disposed so as to form a recess portion between the first protrusion 48A and the reducing portion (the second protrusion 48B), and has an arc shape as seen from the side of the waste-gate channel, as illustrated in FIG. 13. The pressure-receiving portion (the first protrusion 48A) resists exhaust gas having flowed through the waste-gate channel 12, whereby a pressure is applied to the drive-shaft side of the waste-gate valve 24.

The reducing portion is to reduce a flow-rate change amount at the time of slight open of the waste-gate valve 44. As illustrated in FIG. 12, the reducing portion according to the fourth embodiment includes the second protrusion 48B disposed on a side remote from the drive shaft 16 of a surface facing the waste-gate channel 12, in the waste-gate valve 44. The second protrusion 48B is formed symmetric to the first protrusion 48A with respect to a horizontal line passing through the center of the waste-gate valve 44. Thus, the second protrusion 48B has an arc shape, as seen from the side of the waste-gate channel, as illustrated in FIG. 13. The second protrusion 48B has a height not greater than half the diameter $D_1$ of the waste-gate channel. This is because, if the height of the second protrusion 48B is greater than half the diameter $D_1$ of the waste-gate channel, an excessive load could be applied to the lever 15 when the waste-gate valve 44 opens. As illustrated in FIG. 13, the second protrusion 48B remains in a flow of exhaust gas having flowed through the waste-gate channel 12 when the waste-gate valve 44 opens the waste-gate channel 12, which improves flow-rate controllability at the time of slight open.

The waste-gate valve device 41 according to the fourth embodiment of the present invention is capable of applying more pressure to the drive-shaft side of the waste-gate valve 44 when the waste-gate valve 44 opens, and of improving flow-rate controllability at the time of slight open of the waste-gate valve 44. Further, since the second protrusion 48B is formed symmetric to the first protrusion 48A with respect to a horizontal line passing through the center of the waste-gate valve 44, it is possible to mount the waste-gate valve 44 to the lever 15 regardless of the vertical direction of the waste-gate valve 44.

Fifth Embodiment

Figure 14:
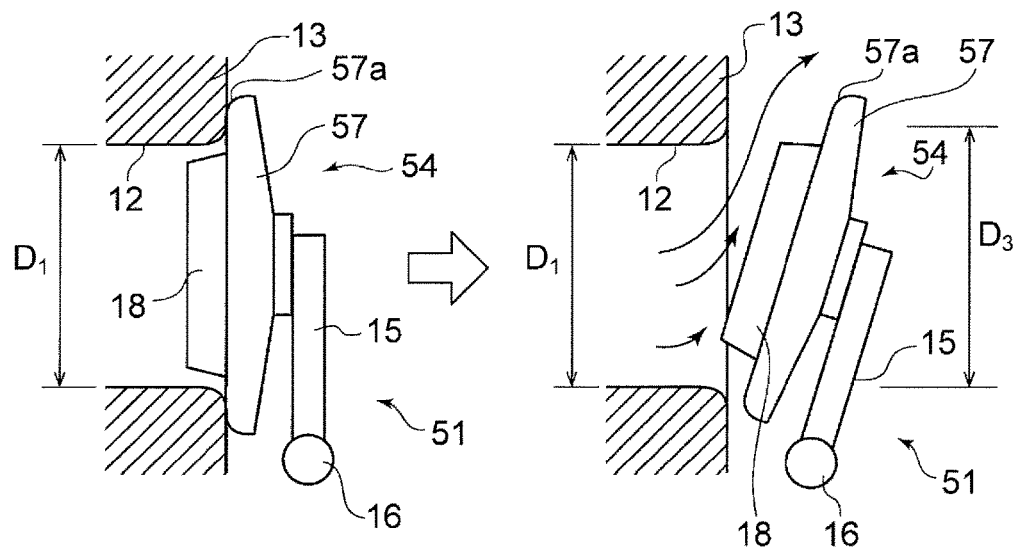
FIG. 14 is a schematic diagram of a waste-gate valve device according to the fifth embodiment of the present invention.

FIG. 14 is a schematic diagram of a waste-gate valve device according to the fifth embodiment of the present invention. A waste-gate valve device 51 according to the fifth embodiment of the present invention is not different from the waste-gate valve device 11 according to the above described first embodiment of the present invention, except for a valve body 57 of a waste-gate valve 54. Thus, the same feature as that in the waste-gate valve device 11 according to the first embodiment of the present invention is indicated by the same reference numeral and not described in detail.

As illustrated in FIG. 14, the waste-gate valve device 51 according to the fifth embodiment of the present invention is to reduce a load applied to the waste-gate valve 54, and has a rim portion 57a formed to have a shape of a curved surface, the rim portion 57a being disposed on a seating side of the valve body 57. Accordingly, exhaust gas having flowed through the waste-gate channel 12 flows along the rim portion 57a at the seating side of the valve body 57, which reduces a load applied to the waste-gate valve 54.

The waste-gate valve device 51 according to the fifth embodiment of the present invention is capable of reducing a load applied to the waste-gate valve 54. Accordingly, the waste-gate valve device 51 according to the fifth embodiment of the present invention is capable of improving flow-rate controllability at the time of slight open of the waste-gate valve 54.

Sixth Embodiment

Figure 15:
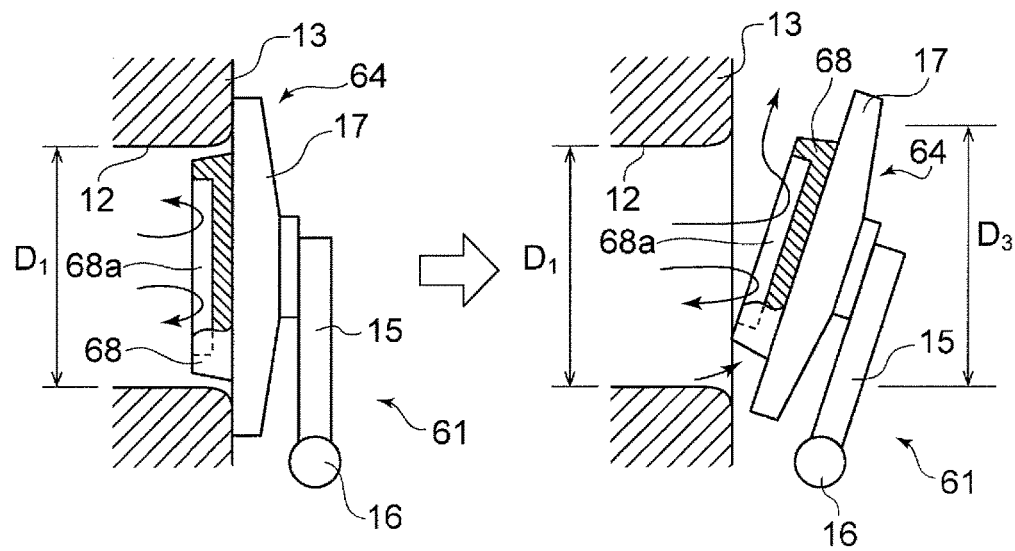
FIG. 15 is a schematic diagram of a waste-gate valve device according to the sixth embodiment of the present invention.
Figure 16:
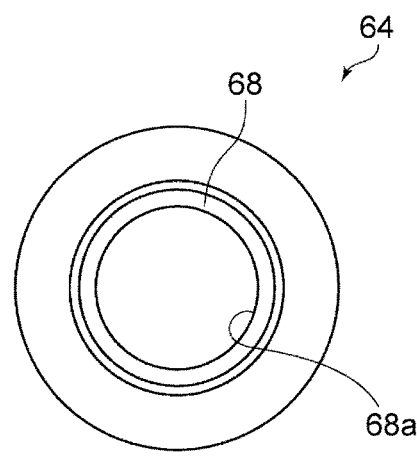
FIG. 16 is a schematic diagram of the waste-gate valve illustrated in FIG. 15.

FIG. 15 is a schematic diagram of a waste-gate valve device according to the sixth embodiment of the present invention. FIG. 16 is a schematic diagram of the waste-gate valve illustrated in FIG. 15. A waste-gate valve device 61 according to the sixth embodiment of the present invention is not different from the waste-gate valve device 11 according to the above described first embodiment of the present invention, except for a protrusion 68 of a waste-gate valve 64. Thus, the same feature as that in the waste-gate valve device 11 according to the first embodiment of the present invention is indicated by the same reference numeral and not described in detail.

As illustrated in FIGS. 15 and 16, the waste-gate valve device 61 according to the sixth embodiment of the present invention includes a protrusion 68 disposed on a surface facing the waste-gate valve channel 12, similarly to the waste-gate valve 11 according to the first embodiment of the present invention. The protrusion 68 according to the sixth embodiment of the present invention further includes a recess portion 68a formed on the protrusion 68 of the present embodiment of the present invention.

The waste-gate valve 64 of the waste-gate valve device 61 according to the sixth embodiment of the present invention can have less weight than the waste-gate valve 14 of the waste-gate valve device 11 according to the above described first embodiment. Further, a drift is caused by the recess portion 68a, which makes it possible to improve flow-rate controllability at the time of slight open of the waste-gate valve 64.

Seventh Embodiment

Figure 17:
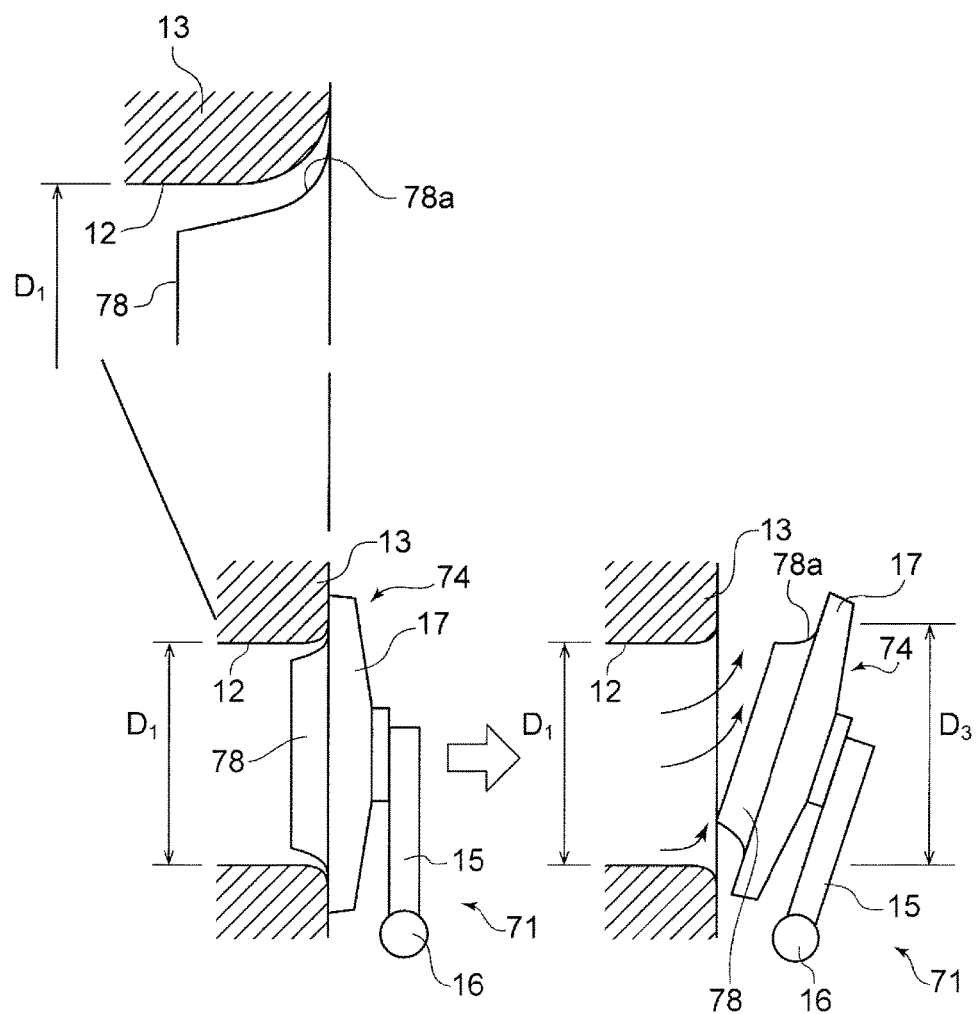
FIG. 17 is a schematic diagram of a waste-gate valve device according to the seventh embodiment of the present invention.

FIG. 17 is a schematic diagram of a waste-gate valve device according to the seventh embodiment of the present invention. A waste-gate valve device 71 according to the seventh embodiment of the present invention is not different from the waste-gate valve device 11 according to the above described first embodiment of the present invention, except for a protrusion 78 of a waste-gate valve 74. Thus, the same feature as that of the waste-gate valve according to the first embodiment of the present invention is indicated by the same reference numeral and not described in detail.

As illustrated in FIG. 17, the waste-gate valve device 71 according to the seventh embodiment of the present invention includes the protrusion 78 disposed on a surface facing the waste-gate valve channel 12, similarly to the waste-gate valve 11 according to the first embodiment of the present invention. The protrusion 78 according to the seventh embodiment of the present invention includes an expanded portion 78a such that a base portion of the protrusion 18 according to the above described first embodiment of the present invention expands along an inner periphery of the expanded portion 78.

The waste-gate valve device 71 according to the seventh embodiment of the present invention is capable of avoiding stress concentration on a boundary between the valve body 17 and the protrusion 78.

Eighth Embodiment

Figure 18:
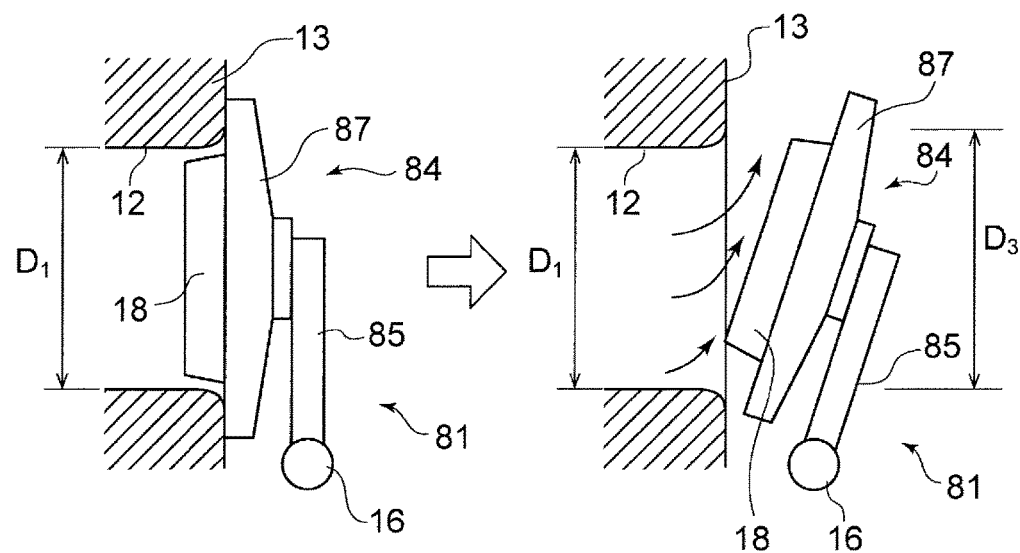
FIG. 18 is a schematic diagram of a waste-gate valve device according to the eighth embodiment of the present invention.

FIG. 18 is a schematic diagram of a waste-gate valve device according to the eighth embodiment of the present invention. As illustrated in FIG. 18, a waste-gate valve device 81 according to the eighth embodiment of the present invention is different from the waste-gate valve 11 according to the above described first embodiment of the present invention in that a waste-gate valve 84 (valve body 87) is rigidly fixed to a lever 85.

With the waste-gate valve device 81 according to the eighth embodiment of the present invention, it is possible to prevent chattering (extremely high-speed mechanical vibration) of the waste-gate valve 84 while there is a little leakage of exhaust gas.

Ninth Embodiment

Figure 19:
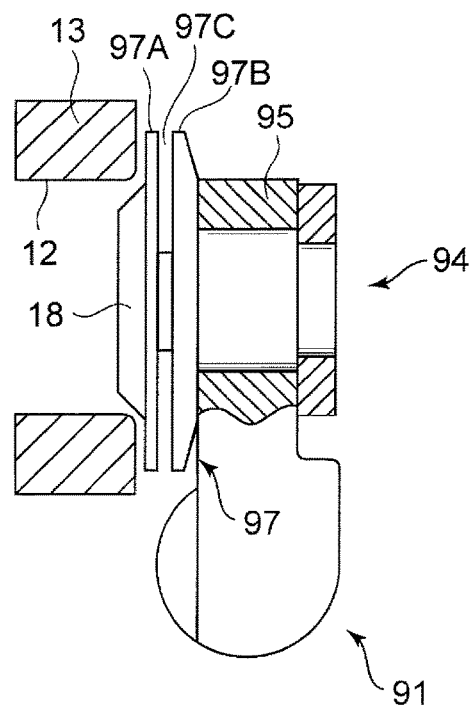
FIG. 19 is a schematic diagram of a waste-gate valve device according to the ninth embodiment of the present invention.

FIG. 19 is a schematic diagram of a waste-gate valve device according to the ninth embodiment of the present invention. As illustrated in FIG. 19, the waste-gate valve device 91 according to the ninth embodiment of the present invention is aimed at improvement of a sealing property (sealability) of the waste-gate valve 94, and the valve body 97 includes an elastic deformation part disposed between an end portion 97A for opening and closing the waste-gate channel 12 and a base portion 97B mounted to a lever 95. The elastic deformation part according to the ninth embodiment includes a slit 97C. In this way, the rigidity of the end portion 97A of the valve body 97 is reduced, and the end portion 97A of the valve body 17 warps when the waste-gate valve 94 closes the waste-gate channel 12 (elastic deformation).

With the waste-gate valve 91 according to the ninth embodiment of the present invention, the end portion 97A of the valve body 17 warps when the waste-gate valve 94 closes the waste-gate channel 12, and sealability of the waste-gate valve 94 is ensured.

Tenth Embodiment

Figure 20:
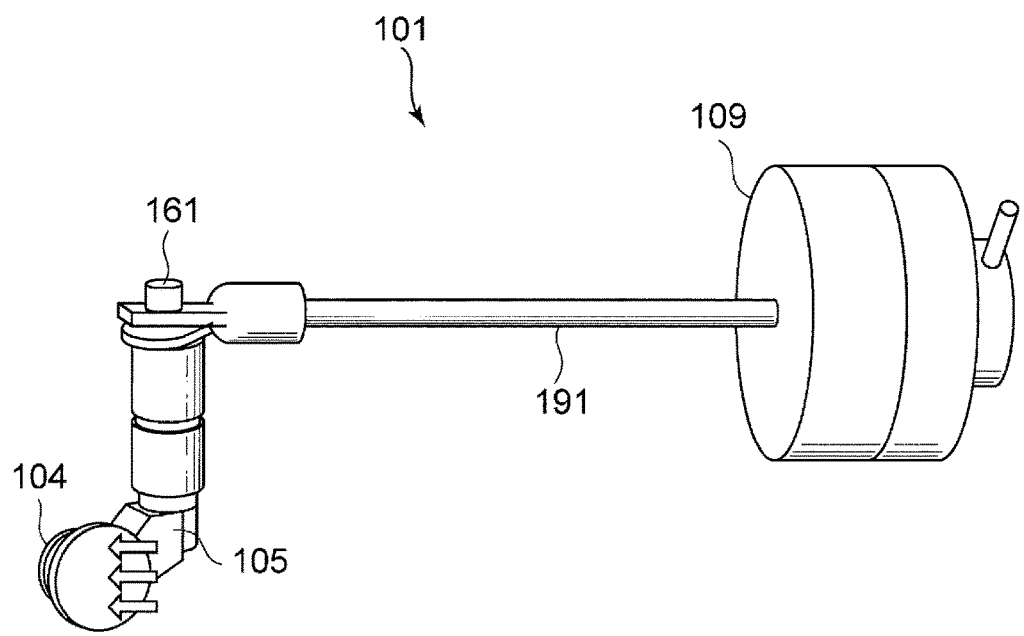
FIG. 20 is a schematic diagram of a waste-gate valve device according to the tenth embodiment of the present invention.
Figure 21:
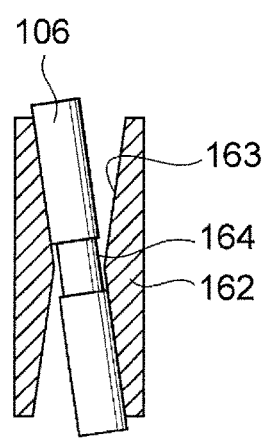
FIG. 21 is a schematic diagram illustrating a drive shaft and a bush supporting the drive shaft.

FIG. 20 is a schematic diagram of a waste-gate valve device according to the tenth embodiment of the present invention. FIG. 21 is a schematic diagram illustrating a drive shaft and a bush supporting the drive shaft. As illustrated in FIG. 20, a waste-gate valve device 101 includes a turbine housing (not illustrated) with a waste-gate channel through which exhaust gas bypasses a turbine, and a waste-gate valve 104 for opening and closing the waste-gate channel. The waste-gate valve 104 is fixed to an end of a drive shaft 106 via a lever 105 and pivots about an axis passing through the center of the drive shaft 106, whereby the waste-gate channel is opened and closed. A lever pin 161 is disposed on the other end of the drive shaft 106, and a rod 191 disposed on an actuator 109 is coupled to the lever pin 161. Accordingly, when the actuator 109 is driven, the drive shaft 106 revolves via the rod 191 and the lever pin 161, and the waste-gate valve 104 opens and closes the waste-gate channel.

Meanwhile, the waste-gate valve device 101 according to the tenth embodiment of the present invention may include a tapered surface 163 to prevent uneven contact of the drive shaft 106 with a bush 162 supporting the drive shaft 106. Specifically, as illustrated in FIG. 21, the tapered surface 163 is formed to have an inner periphery narrowed at the center in the vertical direction and widened at an upper part and a lower part in the vertical direction so that the drive shaft 106 contacts the tapered surface 163 if tilted. Further, the drive shaft 106 is thinned at a stepped portion 164 at the center in the vertical direction, which prevents the drive shaft 106 from being chipped by the narrowed inner periphery.

The waste-gate valve device 101 according to the tenth embodiment of the present invention may be capable of preventing uneven contact of the drive shaft 106 with the bush 162 supporting the drive shaft 106 and thus preventing generation of an edge surface pressure.

Eleventh Embodiment

Figure 22:
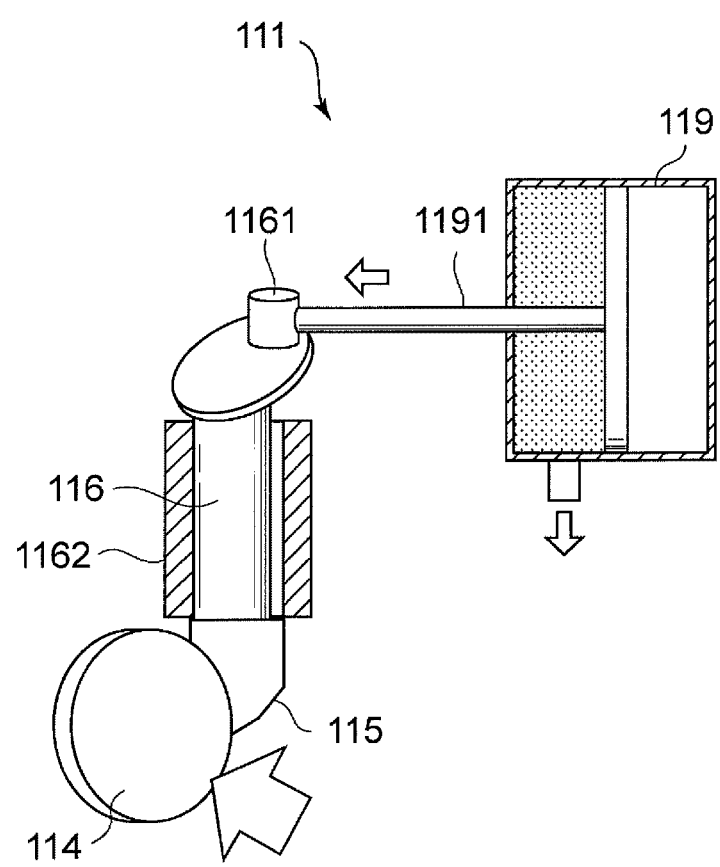
FIG. 22 is a schematic diagram of a waste-gate valve device according to the eleventh embodiment of the present invention.

FIG. 22 is a schematic diagram of a waste-gate valve device according to the eleventh embodiment of the present invention. As illustrated in FIG. 22, a waste-gate valve device 111 includes a turbine housing (not illustrated) with a waste-gate valve channel through which exhaust gas bypasses a turbine, and a waste-gate valve 114 for opening and closing the waste-gate channel. The waste-gate valve 114 is fixed to an end of a drive shaft 116 via a lever 115 and the drive shaft 116 is supported by a bush 1162 disposed on the turbine housing. In this way, the waste-gate valve 114 pivots about an axis passing through the center of the drive shaft 116, and opens and closes the waste-gate channel 12. A lever pin 1161 is disposed on the other end of the drive shaft 116, and a rod 1191 disposed on an actuator 119 is coupled to the lever pin 1161. The lever pin 1161 and the actuator 119 are disposed so that a pressure direction of exhaust gas applied to the waste-gate valve 114 coincides with an operational direction of the actuator 119. Specifically, as illustrated in FIG. 22, the lever pin 1161 and the actuator 119 are disposed so that the waste-gate valve 114 closes the waste-gate channel after the actuator 119 pushes out the rod 1191.

As described above, with the lever pin 1161 and the actuator 1191 being disposed so that the waste-gate valve 114 closes the waste-gate channel when the actuator 119 pushes out the rod 1191, a pressure direction of exhaust gas applied to the waste-gate valve 114 coincides with an operational direction of the actuator 119. In this way, it is possible to prevent inclination of the drive shaft 1161 in a bush. As a result, it is possible to reduce leakage of exhaust gas outside the turbine housing through clearance between the drive shaft 116 and the bush 1162.

As described above, the waste-gate valve 114 according to an embodiment of the present invention is capable of preventing the drive shaft 116 from inclining in a bush because a pressure direction of exhaust gas applied to the waste-gate valve 114 coincides with an operational direction of the actuator 119. As a result, leakage of exhaust gas outside the turbine housing through clearance between the drive shaft 116 and the bush 1162 is prevented. Further, as a result, the drive shaft 116 and the bush 1162 contact each other via a larger contact area, which makes it possible to achieve an effect to reduce abrasion of the drive shaft 116.

INDUSTRIAL APPLICABILITY

As described above, the waste-gate valve device according to the present invention is capable of improving flow-rate controllability at the time of slight open, and can be suitably applied to a waste-gate valve device which diverts a part of exhaust gas, in a supercharged engine equipped with a turbocharger, to adjust a flow rate of exhaust gas entering the turbine.

DESCRIPTION OF REFERENCE NUMERALS

1 Waste-gate valve device
2 Waste-gate channel
2A Widened portion
3 Turbine housing
4 Waste-gate valve
5 Lever
6 Drive shaft
7 Valve body
8 Protrusion
$D_1$ Diameter of waste-gate channel
$D_2$ Flow path diameter of merging portion
$D_3$ Outlet diameter of waste-gate channel
$P_f$ Expansion surface pressure
11 Waste-gate valve device
12 Waste-gate channel
12A Widened portion
13 Turbine housing
14 Waste-gate valve
15 Lever
16 Drive shaft
17 Valve body
18 Protrusion
21 Waste-gate valve device
24 Waste-gate valve
28A First protrusion
28B Second protrusion
31 Waste-gate valve device
34 Waste-gate valve
38 Protrusion
41 Waste-gate valve device 44 Waste-gate valve
48A First protrusion (pressure-receiving portion)
48B Second protrusion (reducing portion)
51 Waste-gate valve device
54 Waste-gate valve
57 Valve body
57a Rim portion
61 Waste-gate valve device
64 Waste-gate valve
68 Protrusion
68a Recess portion
71 Waste-gate valve device
74 Waste-gate valve
78 Protrusion
78a Expanded portion
81 Waste-gate valve device
84 Waste-gate valve
85 Lever
87 Valve body
91 Waste-gate valve device
94 Waste-gate valve
95 Lever
97 Valve body
97A End portion
97B Base portion
97C Slit
101 Waste-gate valve device
104 Waste-gate valve
105 Lever
106 Drive shaft
161 Lever pin
162 Bush
163 Tapered surface
164 Stepped portion
109 Actuator
191 Rod
111 Waste-gate valve device
114 Waste-gate valve
115 Lever
116 Drive shaft
1161 Lever pin
1162 Bush
119 Actuator
1191 Rod

The invention claimed is:

1. A waste-gate valve device, comprising:
a turbine housing comprising a waste-gate channel through which exhaust gas bypasses a turbine and a merging section where exhaust gas having flowed through the waste-gas channel merges with exhaust gas having passed through the turbine; and
a waste-gate valve configured to open and close an outlet of the waste-gate channel, the waste-gate valve comprising
a valve body configured to open and close the outlet of the waste-gate channel, and
a protruding member configured to be housed in the waste-gate channel when the valve body closes the outlet of the waste-gate channel,
wherein the waste-gate channel has a first flow-path diameter ($D_1$) at an input of the waste-gas channel and the merging section of the turbine housing has a second flow-path diameter ($D_2$),
wherein the waste-gate channel ensures a maximum flow rate of exhaust gas at a time when the waste-gate valve is fully open,
wherein a flow-path cross-sectional area ratio of the waste-gate channel to the merging section of the turbine housing is not more than 0.2,
wherein the waste-gate channel has a third flow-path diameter ($D_3$) which is greater than the first flow-path diameter at the outlet of the waste-gate channel, where the flow-path diameter of the waste-gate channel increases forming a curve in cross section and having a flow-path cross sectional area which increases from the input of the waste-gas channel to the merging section of the turbine housing, and
wherein the protruding member includes
a first protrusion that receives, when the waste-gate valve is opened, a pressure of exhaust gas flowing through the waste-gate channel by partially blocking the flow-path of the outlet of the waste-gate channel in a region close to a shaft supporting the waste-gate valve when the waste-gate valve is opened, and
a second protrusion that reduces, when the waste-gate value is being opened, the flow of exhaust gas flowing through the waste-gate channel by partially blocking the flow-path of the outlet of the waste-gate channel in a region remote from the shaft when the waste-gate valve is opened.

2. The waste-gate valve device according to claim 1, wherein the first flow-path diameter ($D_1$) of the waste-gate channel satisfies a following expression 1, with respect to a relationship to the second flow-path diameter ($D_2$)

$$D_1 \leq 0.469 \times D_2 - 0.5 \quad \text{(Expression 1)}.$$

3. The waste-gate valve device according to claim 1, wherein the third flow-path diameter ($D_3$) satisfies a following expression 2, with respect to a relationship to the first flow-path diameter ($D_1$)

$$D_3 \geq 1.049 D_1 \quad \text{(Expression 2)}.$$

4. The waste-gate valve device according to claim 1, wherein the first protrusion is formed in the region close to the shaft, and the second protrusion is formed in the region remote from the shaft.

5. The waste-gate valve device according to claim 1, wherein the first protrusion is formed in an arc shape which forms a recess between the first protrusion and the second portion.

6. The waste-gate valve device according to claim 1, wherein the protruding member further includes a recess which receives exhaust gas flowing through the waste-gate channel.

7. The waste-gate valve device according to claim 1, wherein a base portion of the protruding member includes an expanded portion which expands along an inner periphery of the curve formed by the increase of the flow-path diameter of the waste-gate channel.

8. The waste-gate valve device according to claim 1, wherein the valve body has a rim portion disposed on a seating side of the valve body and formed into a shape of a curved surface.

9. The waste-gate valve device according to claim 1, wherein the valve body comprises
an end portion for opening and closing the waste-gate channel,
a base portion, and
an elastic-deformation portion disposed between the end portion and the base portion and configured to warp the end portion.

10. The waste-gate valve device according to claim 1, further comprising:
   a drive shaft to which the waste-gate valve is fixed; and
   a bush supporting the drive shaft,
   wherein a tapered surface is formed on an inner peripheral surface of the bush.

11. The waste-gate valve device according to claim 1, further comprising:
   a drive shaft comprising an end to which the waste-gate valve is fixed;
   a bush supporting the drive shaft;
   a lever pin disposed on another end of the drive shaft; and
   an actuator comprising a rod coupled to the lever pin,
   wherein the lever pin and the actuator are disposed so that a pressure direction applied to the waste-gate valve coincides with an operational direction of the actuator.

* * * * *